United States Patent
Sthanumoorthy

(10) Patent No.: US 9,336,138 B2
(45) Date of Patent: May 10, 2016

(54) METHOD AND APPARATUS FOR IMPLEMENTING GARBAGE COLLECTION WITHIN A COMPUTING ENVIRONMENT

(71) Applicant: Verizon Patent and Licensing Inc., Basking Ridge, NJ (US)

(72) Inventor: Neelakantan Sthanumoorthy, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 14/015,631

(22) Filed: Aug. 30, 2013

(65) Prior Publication Data

US 2015/0067289 A1    Mar. 5, 2015

(51) Int. Cl.
*G06F 12/02* (2006.01)
*G06F 11/30* (2006.01)
*G06F 11/07* (2006.01)

(52) U.S. Cl.
CPC ........ *G06F 12/0261* (2013.01); *G06F 11/3037* (2013.01); *G06F 12/0269* (2013.01); *G06F 11/0793* (2013.01)

(58) Field of Classification Search
CPC ............ G06F 11/3037; G06F 11/0751; G06F 11/0754; G06F 11/0793; G06F 12/0253; G06F 12/0261
See application file for complete search history.

(56) References Cited

U.S. PATENT DOCUMENTS

| | | | |
|---|---|---|---|
| 2005/0076184 A1* | 4/2005 | Schumacher | 711/170 |
| 2006/0136530 A1* | 6/2006 | Rossmann | 707/206 |
| 2008/0004841 A1* | 1/2008 | Nakamura | 702/186 |
| 2009/0013145 A1* | 1/2009 | Chittigala | 711/170 |
| 2011/0252276 A1* | 10/2011 | Tsai et al. | 714/16 |
| 2012/0137006 A1* | 5/2012 | Minato et al. | 709/226 |
| 2012/0173713 A1* | 7/2012 | Wang et al. | 709/224 |
| 2013/0055034 A1* | 2/2013 | Qiu et al. | 714/47.1 |
| 2013/0145220 A1* | 6/2013 | Lv | 714/47.1 |
| 2014/0310714 A1* | 10/2014 | Chan et al. | 718/102 |

\* cited by examiner

*Primary Examiner* — Hal Schnee

(57) ABSTRACT

An approach is provided for obtaining memory management information associated with a computing environment, processing the memory management information to determine one or more computing devices within the computing environment experiencing full garbage collection, and resetting memory of the one or more computing devices to correct the full garbage collection.

20 Claims, 11 Drawing Sheets

METHOD AND APPARATUS FOR IMPLEMENTING GARBAGE COLLECTION WITHIN A COMPUTING ENVIRONMENT

BACKGROUND INFORMATION

Garbage collection is a form of memory management associated with the reclamation of memory occupied by objects that are no longer in use. Computer systems typically have processes to implement garbage collection. However, these processes may fail resulting in the breakdown of memory management and memory that is entirely full, also referred to full garbage collection. Full garbage collection is particularly troubling because systems suffering from full garbage collection may appear to be operating as normal. In large computing environments, entire servers and/or nodes may achieve full garbage collection without other system issues arising to indicate an issue; other than, for example, a reduction in overall performance as a result of the decrease in memory. Further, identification and correction of full garbage collection in large operating environments is complex and time consuming. Moreover, costs or business losses associated with the decrease in performance as a result of full garbage collection, or near full garbage collection, can quickly mount even over short periods of time, particularly for large computing environments.

Based on the foregoing, there is a need for the detection and correction of full garbage collection within a computing environment.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for detecting and correcting full garbage collection within a computing environment are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although various embodiments are described with respect to one or more servers within a computing environment, it is contemplated that the approach described herein may be used with any type of computing devices, not limited to servers.

Figure 1:
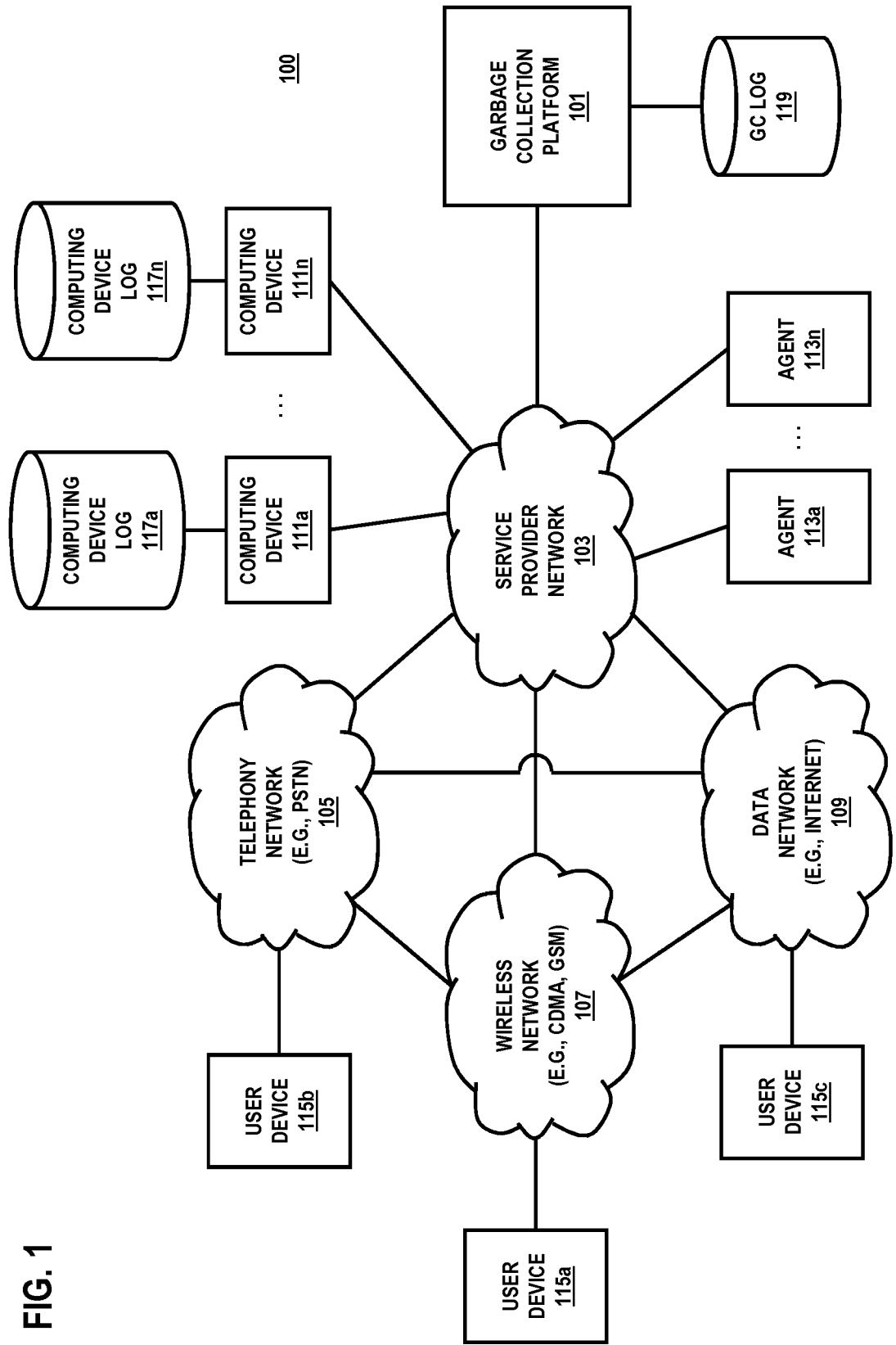
FIG. 1 is a diagram of a system capable of detecting and correcting full garbage collection within a computing environment, according to one embodiment.

FIG. 1 is a diagram of a system capable of detecting and correcting full garbage collection within a computing environment, according to one embodiment. As shown, the system 100 includes a garbage collection platform 101 implemented as, for example, part of a service provider network 103 for detecting and correcting full garbage collection within a computing environment. The computing environment may be within or associated with the server provider network 103. However, in alternative embodiments, the garbage collection platform 101 could be implemented as any part of the system 100. As discussed above, computer systems typically have processes to implement garbage collection. However, these processes may fail or otherwise breakdown resulting in the failure of memory management. When memory management fails, memory may become full of objects that are no longer in use, resulting in full garbage collection or conditions approaching full garbage collection. Large computing environments that have computing devices and/or nodes that are experiencing full garbage collection may experience performance degradation as the computing devices and/or nodes within the computing environment suffer from the full garbage collection. Yet, it may be difficult to track down which computing device and/or node is causing the degradation because of the full garbage collection. Identification of the computing device and/or node affecting performance of the computing environment may be difficult because of searching for full garbage collection can be tedious as each computing device and/or node must be manually checked. The complexity of determining which computing device and/or node experiencing full garbage collection can cause significant business expense and/or loss as a result of the loss of performance and the time required to correct the issue.

The approach of the system 100 stems, in part, from the need to reduce the complexity of determining computing devices and/or nodes within a system that suffer from garbage collection in an efficient manner. The approach of the system 100 further stems, in part, from the need to efficiently correct the full garbage collection once the computing devices and/or nodes are found. The approach of system 100 is flexible such that it can be implemented in different types of computing environments, particularly large clustered environments, to reduce the complexity and expense caused by failure in memory management resulting in full garbage collection.

The service provider network 103 can interact with one or more other networks, such as a telephony network 105, a wireless network 107, and/or a data network 109. The service provider network 103 can include one or more computing devices 111a-111n (collectively referred to as computing devices 111) that individually, or in combination, form one or more computing environments within the service provider network 103. For example, one or more of the computing devices 111 may constitute application servers, such as Jboss, WebLogic, etc., web servers, production servers, communication servers, catalog servers, database servers, etc. that form one or more computing environments within the service provider network 103. By way of a specific example, one or more of the computing devices 111 may form a computing environment for workflow management within the service provider network 103. A single computing environment associated with the service provider network 103 may have many computing devices 111, with groups of the computing devices 111 having different roles, such as a group of servers serving as application servers, production servers, etc. Further, the computing devices 111 may be clustered in a distributed environment or a standalone environment within the service provider network 103 and the computing devices 111 may include nodes within the computing environment. The computing devices 111 may be executing one or more applications, such as the application servers executing application for performing one or more functions within a computing environment. By way of a specific example, where the computing environment is based on workflow management, an application executing by one or more application servers may be a real time adherence monitoring program.

The system 100 may further include one or more agents 113a-113n (collectively referred to as agents 113) that may serve various roles and/or functions within the service provider network 103. The agents 113 may execute one or more functions associated with the service provider providing one or more services to one or more customers. The agents 113 may further provide one or more services internally to the service provider within the service provider network 103. In one embodiment, one or more agents 113 may provide support to users that subscribe to one or more services provided by the service provider. One or more of the computing devices 111 may form a computing environment for workforce management over the agents 113, such as a call center for agents 113 servicing one or more users for troubleshooting issues associated with one or more of the service provider network 103, the telephony network 105, the wireless network 107, etc. In such an embodiment, the workforce management computing environment may include one or more systems, processes and/or modules to track performance of the one or more agents, such as the above-discussed real time adherence monitoring program.

For illustrative purposes, the networks 103-109 may be any suitable wireline and/or wireless network, and be managed by one or more service providers. For example, telephony network 105 may include a circuit-switched network, such as the public switched telephone network (PSTN), an integrated services digital network (ISDN), a private branch exchange (PBX), or other like network. Wireless network 107 may employ various technologies including, for example, code division multiple access (CDMA), enhanced data rates for global evolution (EDGE), general packet radio service (GPRS), mobile ad hoc network (MANET), global system for mobile communications (GSM), long term evolution (LTE), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 103-109 may be completely or partially contained within one another, or may embody one or more of the aforementioned infrastructures. For instance, the service provider network 103 may embody circuit-switched and/or packet-switched networks that include facilities to provide for transport of circuit-switched and/or packet-based communications. It is further contemplated that networks 103-109 may include components and facilities to provide for signaling and/or bearer communications between the various components or facilities of the system 100. In this manner, networks 103-109 may embody or include portions of a signaling system 7 (SS7) network, or other suitable infrastructure to support control and signaling functions.

According to exemplary embodiments, user devices 115a-115c (collectively referred to as UDs 115) may be utilized to communicate over system 100 and may include any customer premise equipment (CPE) capable of sending and/or receiving information over one or more of networks 103-109. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

An application running one or more of the computing devices 111 or one or more the computing devices 111 in general may experience full garbage collection upon the breakdown of memory management. This may occur, for example, when a normal garbage collection process fails or an application otherwise encounters an error that leads to failure to remove unused objects in memory. When full garbage collection occurs on a server, for example, a production outage may occur resulting in the loss of business and/or added expense. The garbage collection platform 101 prevents such outages caused by full garbage collection by determining full garbage collection activity prior to or at the time of outages. The garbage collection platform 101 may further alert one or more agents 113 that are responsible for, or have the capability to correct such full garbage collection issues. The garbage collection platform 101 allows for determining the computing devices (s) 111 and/or node(s) running the application that is currently experiencing full garbage collection. The garbage collection platform 101 may then restart the computing device and/or node individually. Moreover, the garbage collection platform 101 may be configured with one or more scripts that include the commands to login to the computing devices and/or nodes individually or in combination to effectuate stoppage or restart of the computing devices and/or nodes. Thus, the garbage collection platform 101 removes the need for agents 113 to know login commands, accounts and passwords, as well as the specific commands to either stop and start or restart the one or more affected computing devices and/or nodes. Further, the garbage collection platform 101 allows for remote login by one or more agents 113 for restarting one or more nodes affected by full garbage collection such that it is not necessary for an individual to be present at the location of any computing device and/or node affected by full garbage collection.

The garbage collection platform 101 may be implemented in any client/server or multi-tier architecture system. The garbage collection platform 101 can manage nodes in a clustered environment or a standalone environment, server instances running in a clustered mode or a standalone mode, and can be extended to support and manage any application and/or web server production instance running across an enterprise and/or business environment. In one embodiment, the garbage collection platform 101 may be implemented using HyperText Markup Language (HTML), JavaServer Pages (JSP), and/or Javascripts along with one or more shells (e.g., UNIX shells). By way of example, a user interfacing with the garbage collection platform 101 may use one or more user interfaces, such as web-based user interfaces, generated using HTML, JSP, and/or Javascripts to interact with a main shell within the computing environment. Servers 111 within the computing environment may execute one or more worker shells that interact with the main shell for executing the functionality of the garbage collection platform 101. Thus, the main shell (e.g., parent shell) may delegate one or more tasks to one or more worker shells for detecting and correcting full garbage collection on one or more computing devices 111 within a computing environment. However, the garbage collection platform 101 is not limited to being implemented according to a specific method and may be implemented according to various other methods. For example, the garbage collection platform 101 may be implemented and/or interfaced with using to one or more native applications running in the computing environment and/or on one or more of the computing devices 111.

In one embodiment, the garbage collection platform 101 includes the ability to perform a stack trace (e.g., JStack trace) on the computing devices and/or nodes experiencing full garbage collection for debugging of the event or error that caused the full garbage collection. The stack trace information may then be stored in one or more logs within the system, such as one or more computing device logs 117a-117n (collectively referred to as computing device logs 117) or a GC log 119 associated with the garbage collection platform 101. Further analysis of the stack trace information may determine why the node went into full garbage collection. In one embodiment, the garbage collection platform 101 may transfer the stack trace information saved in one of the logs to a vendor associated with the application or node that experienced the full garbage collection for the analysis. In one embodiment, the garbage collection platform 101 may send an automatic email to a vendor of a server and/or application running on the server indicating the issue and including the stack trace information for the vendor to debug.

The garbage collection platform 101 allows a user to select a computing devices type, such as web server and/or application server. Upon selecting the server type, the garbage collection platform 101 may display preconfigured information associated with the server type, including, for example, nodes that are currently available for the server. The garbage collection platform 101 may further determine which of the nodes are currently running at full garbage collection. Upon determining the nodes that are running at full garbage collection, stack trace information may be obtained for one or more of the nodes by the garbage collection platform 101, in addition to one or more of the nodes being restarted. Upon restarting, the nodes will no longer suffer from full garbage collection and will perform normally within the computing environment. In one embodiment, the garbage collection platform 101 may determine the stack trace information and/or restart multiple nodes experiencing full garbage collection at the same time. Further, all of the nodes, both nodes experiencing and not experiencing full garbage collection, may have the stack trace information gathered and/or may be restarted at the same time through the garbage collection platform 101 by restarting the entire server (e.g., application server) associated with the nodes.

In one embodiment, the garbage collection platform 101 monitors one or more computing devices 111 for full garbage collection by retrieving information from one or more computing device logs 117 associated with the computing devices 111 that indicates the activity associated with garbage collection and whether the computing devices 111 are currently experiencing full garbage collection. The garbage collection platform 101 may gather the garbage collection information for multiple computing devices 111 in response to a single request, such as a single request from an agent 113a within the computing environment. Thus, the garbage collection platform 101 aids in quickly accessing garbage collection information for one or more computing devices 111 without a user having to manually access each computing device 111 or each log associated with each computing device 111 to obtain the log information. Based on the collected log information, in one embodiment the garbage collection platform 101 may determine to restart one or more computing devices 111 and/or nodes. Alternatively, or in addition, in one embodiment the garbage collection platform 101 may alert one or more agents 113 regarding the full garbage collection or potential for full garbage collection regarding one or more computing devices 111 and/or nodes. The one or more agents 113 may then access the stack trace information and/or restart the affected computing devices 111 and/or nodes using the garbage collection platform 101.

In one embodiment, the garbage collection platform 101 may automatically monitor one or more logs and/or one or more computing devices to determine if a threshold associated with garbage collection is satisfied. The threshold may represent, for example, that a specific capacity of memory for one or more computing devices and/or associated with one or more applications running on the one or more computing devices has reached a limit with respect to objects that are no longer in use. In one embodiment, the threshold may be 100% or that the memory has reached full capacity with unused objects. In one embodiment, the threshold may be less than 100% or full capacity, such as 90%, 80%, etc. Upon determining that the threshold is satisfied, the garbage collection platform 101 may further determine the computing devices and/or nodes associated with satisfying the threshold.

Figure 2:
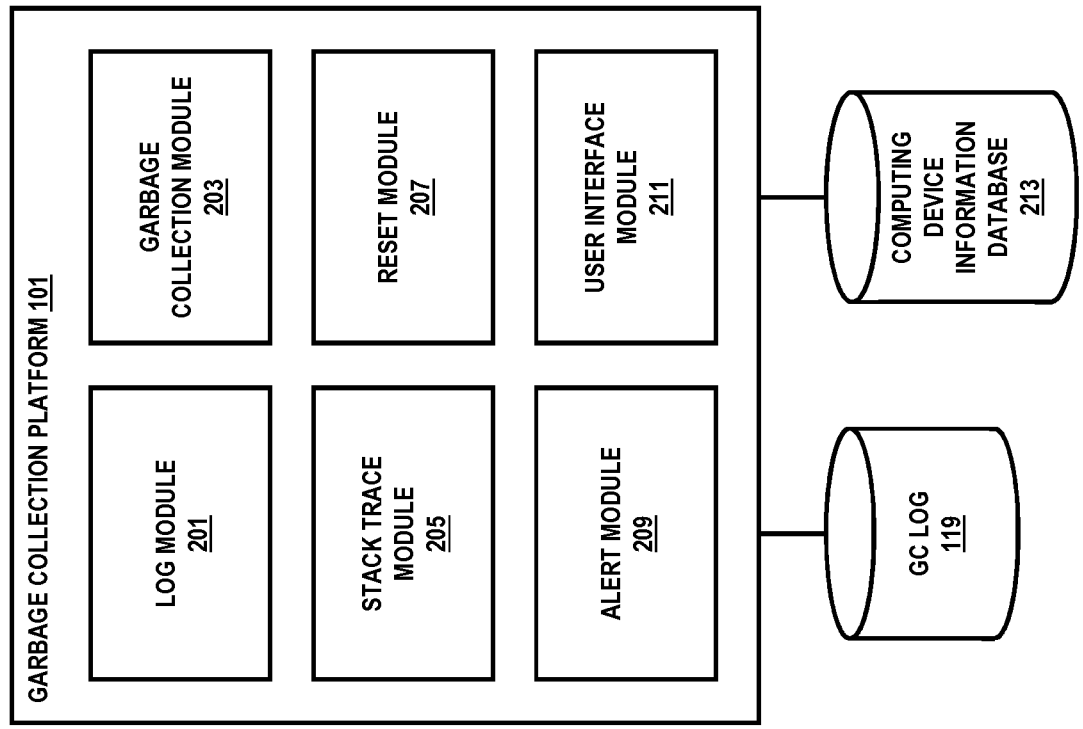
FIG. 2 is a diagram of a garbage collection platform capable of detecting and correcting full garbage collection within a computing environment, according to one embodiment.

FIG. 2 is a diagram of the components of a garbage collection platform 101, according to one embodiment. By way of example, the garbage collection platform 101 includes one or more components for detecting and correcting full garbage collection within a computing environment. It is contemplated that the functions of these components may be combined in one or more components or performed by other components of equivalent functionality. In this embodiment, the garbage collection platform 101 includes a log module 201, a garbage collection module 203, a stack trace module 205, a reset module 207, an alert module 209, and a user interface module 211.

The log module 201 interfaces with the computing device logs 117 to determine log information pertaining to memory management for the computing devices 111 within the computing environment. The log module 201 accesses the logs 117 to determine the memory management information that is processed to determine if the computing devices 111 are currently experiencing full garbage collection. In one embodiment, the log module 201 retrieves the raw log information without reformatting the information for display. In one embodiment, the log module 201 may process the log information by, for example, reformatting the information for display. The reformatting may involve, for example, removing from the log information any information not associated with memory management information, garbage collection information, or a combination thereof. Thus, in one embodiment, the log information may only comprise memory management information concerning full garbage collection. The log module 201 may access any number of the computing devices 111 and/or computing device logs 117 that the garbage collection platform 101 is configured to communicate with, including all of the computing devices 111 and/or computing device logs 117, so that the garbage collection platform 101 may determine the computing devices 111 experiencing full garbage collection. The log module 201 may, in one embodiment, access information for connecting and communicating with the computing devices 111 from the computing device information database 213.

In one embodiment, the garbage collection platform 101 may include a garbage collection module 203 that processes the log information, particularly the memory management information, to determine if there are computing devices 111 and/or nodes currently experiencing full garbage collection and the information regarding these computing devices 111. For example, the garbage collection module 203 may process the memory management information to determine a specific server out of all of servers that are experiencing full garbage collection. In one embodiment, the garbage collection module 203 may present the information regarding the computing devices 111 and/or nodes that are suspected of experiencing full garbage collection to an agent 113. The agent may then decide whether the computing devices 111 and/or nodes are indeed experiencing full garbage collection and act on the information. However, rather than requiring the agent 113 to manually check each of the computing devices 111 and/or nodes, the garbage collection module 203 may present collected information to the agent 113 such that the agent can quickly make a determination regarding full garbage collection.

The stack trace module 205 determines stack trace information for the computing devices 111 in the computing environment. The stack trace module 205 may issue one or more commands to one or more of the computing devices 111 for the stack trace information. In one embodiment, the stack trace module 205 retrieve instructions, scripts and/or commands for interfacing with the computing devices 111 for requesting the stack trace information from the computing device information database 213. Alternatively, the stack trace module 205 may retrieve the information for accessing the computing devices 111 from the user through one or more user prompts and inputs. The stack trace module 205 may retrieve stack trace information in response to receiving a request for the stack trace information, upon determining one or more computing devices 111 that are experiencing or may be experiencing full garbage collection, or a combination thereof. In response to receiving the stack trace information, the stack trace module 205 stores the received stack trace information in, for example, or log or a database, such as the GC log 119. However, the stack trace information may be stored in any other log or database, such as in one or more of the computing device logs 117. In one embodiment, the stack trace module 205 may forward the received stack trace information to an entity associated with the computing environment and/or the computing devices 111 that experienced the full garbage collection so that the entity may debug the stack trace information to determine why full garbage collection occurred.

The reset module 207 resets the memory associated with the full garbage collection. Resetting may occur according to various methods, such as restarting the affected server and/or node, dumping the memory of the affected memory, restarting one or more applications, processes, and/or functions on the affected server, etc. By way of example, in one embodiment, the reset module 207 may issue a restart command to an affected server. The reset module 207 may retrieve the instructions, scripts and/or commands for interfacing with the computing devices 111 for restarting the computing devices 111 from the computing device information database 213.

The alert module 209 generates alerts associated with detection of full garbage collection or satisfaction of a garbage collection threshold. The alert module 209 can notify one or more entities, such as information technology specialist contact, within the computing environment of the occurrence of full garbage collection and/or potential full garbage collection so that the issues can be resolved. The alert module 209 may monitor memory management information and/or receive information from one or more other modules within the garbage collection platform 101 regarding detection of full garbage collection or the potential for full garbage collection. The alert module 209 may then transmit one or more alerts to the one or more entities responsible for resolving the issue. Thus, in one embodiment, the alert may be transmitted so as to correct the full garbage collection prior to a manual request to, for example, look into why the computing environment is not operating at normal conditions. The alert may be in the form of any communication type, including email, short message service (SMS), multimedia messaging service (MMS), numeric and/or audio pages, automated telephone calls, etc. that can be sent to the entities.

In one embodiment, the user interface module 211 generates user interfaces for one or more agents 113, such as at one or more terminals of the agents 113, for accessing functionality of the garbage collection platform 101. In one embodiment, the user interfaces generated by the user interface module 211 may use HTML), JSP, and/or Javascripts along with one or more shells (e.g., UNIX shells) for generating web-based user interface pages allowing users to remotely interact with the garbage collection platform 101 outside of the computing environment. Thus, the user interface module 211 may generate web pages displayed in a browser for a user, such as one or more of the agents 113, to interact with the garbage collection platform 101 for detecting and correcting full garbage collection with a computing environment.

Figure 3:
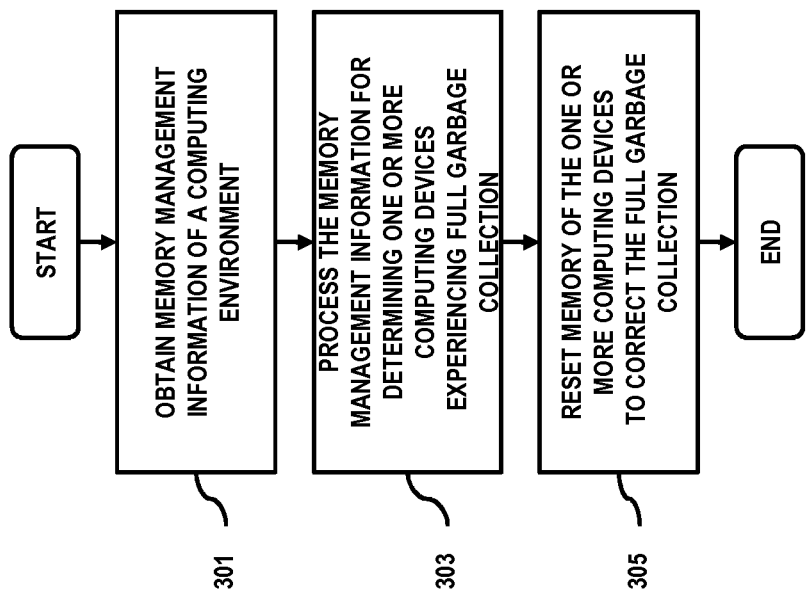
FIG. 3 is a flowchart of detecting and correcting full garbage collection within a computing environment, according to one embodiment.
Figure 8:
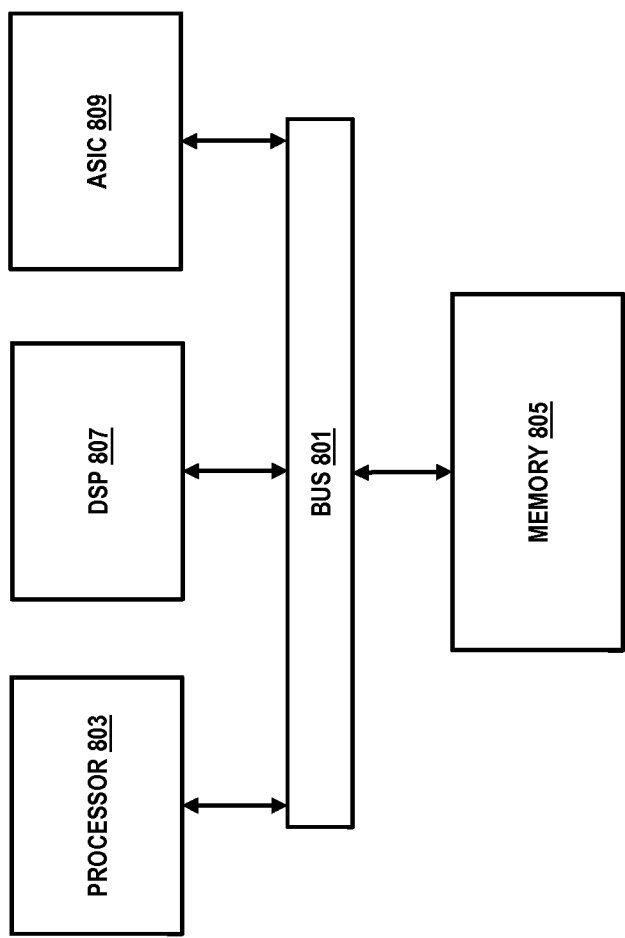
FIG. 8 is a diagram of a chip set that can be used to implement various exemplary embodiments.

FIG. 3 is a flowchart of a process of detecting and correcting full garbage collection within a computing environment, according to one embodiment. In one embodiment, the garbage collection platform 101 performs the process 300 and is implemented in, for instance, a chip set including a processor and a memory as shown in FIG. 8. At step 301, the garbage collection platform 101 obtains memory management information form a computing environment. The computing environment may include many computing devices, such as servers, that together constitute the environment. In one embodiment, the servers may be clustered to form the environment. Further, there may be more than one type of server within the environment, such as an application server, web server, production server, disaster recovery server, etc. By way of example, the computing environment may be a workforce management computing environment implemented by a service provider within the service provider network 103 to manage one or more agents 113 within the service provider network 103. Thus, the computing environment may include many different types of servers with each type of server including many different servers. Further, the servers may be associated with nodes, such as an application server including multiple nodes (e.g., 17 nodes).

In one embodiment, the memory management information pertains to the status of memory, including memory that is used/unused and the nature of the objects stored within the memory. In one embodiment, the memory management information of the computing environment specifically pertains to the status of garbage collection of the servers within the environment. By way of example, if a server within the computing environment is an application server, the memory management information may pertain to the status of memory occupied by objects that are no longer in use by one or more applications running on the application server. The information may be obtained according to various methods, including interfacing with one or more of the servers to directly obtain the information or interfacing with one or more logs that store the information. Thus, in one embodiment, servers within the computing environment may continuously, periodically, or on-demand store memory management information in one or more logs, such as server logs 117 illustrated in FIG. 1. Further, the memory management information may be obtained continuously, periodically, or in response to one or more specific commands to obtain the information (e.g., on-demand). Further, the garbage collection platform 101 may include one or more commands, scripts and/or instructions for obtaining the memory management information from the servers and/or server logs, including, for example, account information, passwords and specific commands to access the information.

At step 303, upon obtaining the memory management information, the information is processed by the garbage collection platform 101 for determining computing devices within the computing environment experiencing full garbage collection. In one embodiment, the garbage collection platform 101 processes the memory management information to extract from the information the computing devices and/or specific log information that indicates the computing devices, such as servers, that are experiencing full garbage collection. By way of example, a computing environment may include multiple (e.g., five) servers. The memory management information may indicate that only a portion (e.g., two) of the servers are currently experiencing full garbage collection. The garbage collection platform 101 may process the memory management information to disregard information regarding the three servers not experiencing full garbage collection and maintain the information that indicates the servers that are experiencing full garbage collection. In one embodiment, the garbage collection platform 101 may process the memory management information to determine servers that are suspected of experiencing full garbage collection and pass this information to an agent 113 within the service provider network 103 for the agent 113 to make the determination of full garbage collection. In such an example, the garbage collection platform 101 may display the memory management information on a terminal associated with the agent 113 pertaining to the servers suspected of experiencing full garbage collection for the agent 113 to then make the ultimate determination.

Upon determining the computing devices that are experiencing full garbage collection, at step 305 the garbage collection platform 101 resets the memory of the computing devices to correct the full garbage collection. Resetting the memory may occur according to various methods. In one embodiment, the computing devices, such as servers, may be restarted, by issuing restart commands or stop and start commands. Thus, the garbage collection platform 101 may include instructions, scripts and/or commands for interfacing with the servers for restarting the servers. In one embodiment, the garbage collection platform 101 may cause a memory dump to reset the memory without restarting the servers. In one embodiment, the garbage collection platform 101 may restart one or more applications running on the servers to reset the memory and/or individually restart one or more nodes associated with the servers. According to the forgoing, resetting the memory corrects the full garbage collection, which improves the performance of the affected servers and the overall performance of the computing environment. Moreover, according to the process 300, the determination of which servers are experiencing garbage collection issues may be quickly made for any number of servers within the computing environment without requiring, for example, an agent 113 logging into each sever individually and accessing memory management information. Thus, computing environments experiencing issues with performance as a result of full garbage collection may be quickly corrected to avoid the potential expense and business loss as a result of the performance degradation associated with full garbage collection.

Figure 4:
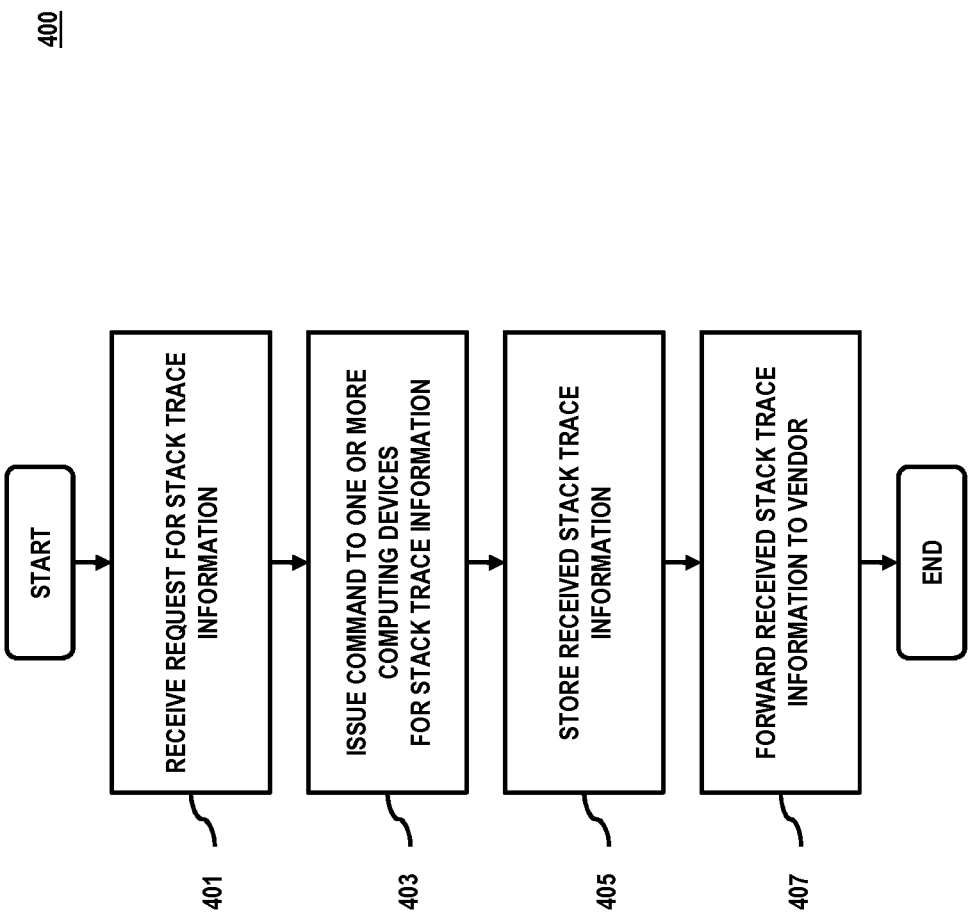
FIG. 4 is a flowchart of determining stack trace information for one or more computing devices in a computing environment experiencing full garbage collection, according to one embodiment.

FIG. 4 is a flowchart of a process of determining stack trace information for the computing devices in the computing environment, according to one embodiment. In one embodiment, the garbage collection platform 101 performs the process 400 and is implemented in, for instance, a chip set including a processor and a memory as shown in FIG. 8. At step 401, the garbage collection platform 101 may receive a request for stack trace information associated with one or more of the computing devices determined to be experiencing full garbage collection. The request may be received, for example, in response to an agent 113 within the service provider network 103 issuing a command to the garbage collection platform 101 upon determining computing devices within the computing environment are experiencing full garbage collection.

At step 403, the garbage collection platform 101 issues a command to one or more of the computing devices for the stack trace information. In one embodiment, the garbage collection platform 101 may include instructions, scripts and/or commands for interfacing with the computing devices for requesting the stack trace information. In view of step 401, the garbage collection platform 101 may issue the command in response to receiving a request for the stack trace information. However, in one embodiment, the garbage collection platform 101 may issue the command for stack trace information independent from receiving a request for stack trace information. Rather, as an example, the garbage collection platform 101 may issue a command for stack trace information upon determining one or more computing devices that are experiencing or may be experiencing full garbage collection. In response to the stack trace command, the garbage collection platform 101 receives stack trace information that identifies, for example, the active stack frames at a certain point in time during execution of one or more processes on the computing devices.

At step 405, the garbage collection platform 101 stores the received stack trace information. The information may be stored, for example, in one or more logs associated with the computing devices, such as the computing device logs 117, or in one or more logs associated with the garbage collection platform 101, such as the GC log 119. The stack trace information may be stored in correlation with other information, such as the servers associated with the stack trace information, the date and time of the stack trace request, etc.

Alternatively, or in addition to step 405, the process 400 may proceed to step 407 in which the received stack trace information is forwarded to an entity associated with the computing environment and/or the computing devices that experienced the full garbage collection. In one embodiment, the entity may be a third-party vendor that supplied and/or configured the computing environment within the service provider network 103. By way of example, a vendor may setup a workforce management computing environment for the service provider within the service provider network 103. The stack trace information may be sent to the vendor so that the vendor may debug the information to determine why the computing environment experienced the full garbage collection. By way of another example, the stack trace information may be sent to a third-party vendor associated with a server, in addition to or rather than the above-discussed vendor, so that the vendor may debug the stack trace information to determine why the server experienced the full garbage collection. Thus, based on the received stack trace information, the cause of the full garbage collection may be determined, and any corrective measures may be determined and potentially implanted within the system 100.

Figure 5:
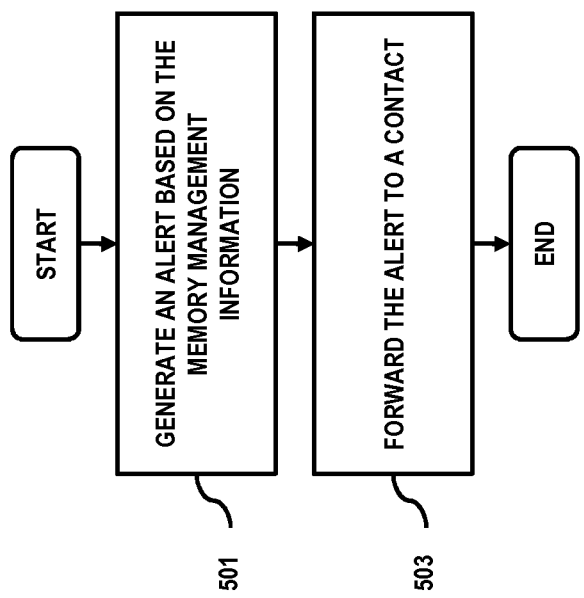
FIG. 5 is a flowchart of generating an alert associated with a garbage collection threshold, according to one embodiment.

FIG. 5 is a flowchart of a process of generating an alert associated with a garbage collection threshold, according to one embodiment. In one embodiment, the garbage collection platform 101 performs the process 500 and is implemented in, for instance, a chip set including a processor and a memory as shown in FIG. 8. At step 501, the garbage collection platform 101 may generate an alert based on the received memory management information of the computing environment. The garbage collection platform 101 may process the memory management information and determine one or more computing devices that are at full garbage collection or approaching full garbage collection. The alert for full garbage collection may be implemented so as to correct the full garbage collection prior to a manual request to, for example, look into why the computing environment is not operating at normal conditions. Further, the alert may be based on the memory management information satisfying a garbage collection threshold. In one embodiment, the garbage collection threshold may be less than full garbage collection. The alert for less than full garbage collection may be implemented so as to correct an issue that may result in full garbage collection prior to full garbage collection actually occurring. The garbage collection platform 101 may continuously, periodically, or on-demand process memory management information to generate an alert, if necessary, based on the status of the computing environment indicated in the memory management information.

At step 503, the garbage collection platform 101 may forward the alert to a designated contact associated with the computing environment. The alert may be forwarded to the contact to indicate to the contact that full garbage collection is occurring or may potentially occur. In one embodiment, the contact may be, for example, the information technology agent assigned to monitor for and/or correct issues concerning full garbage collection. The alert may be in the form of any communication type, including an email, SMS, MMS, page, automated telephone call, etc. that can be sent to the contact. Thus, upon receiving the alert, the contact can correct or prevent the full garbage collection issue.

Figure 6A:
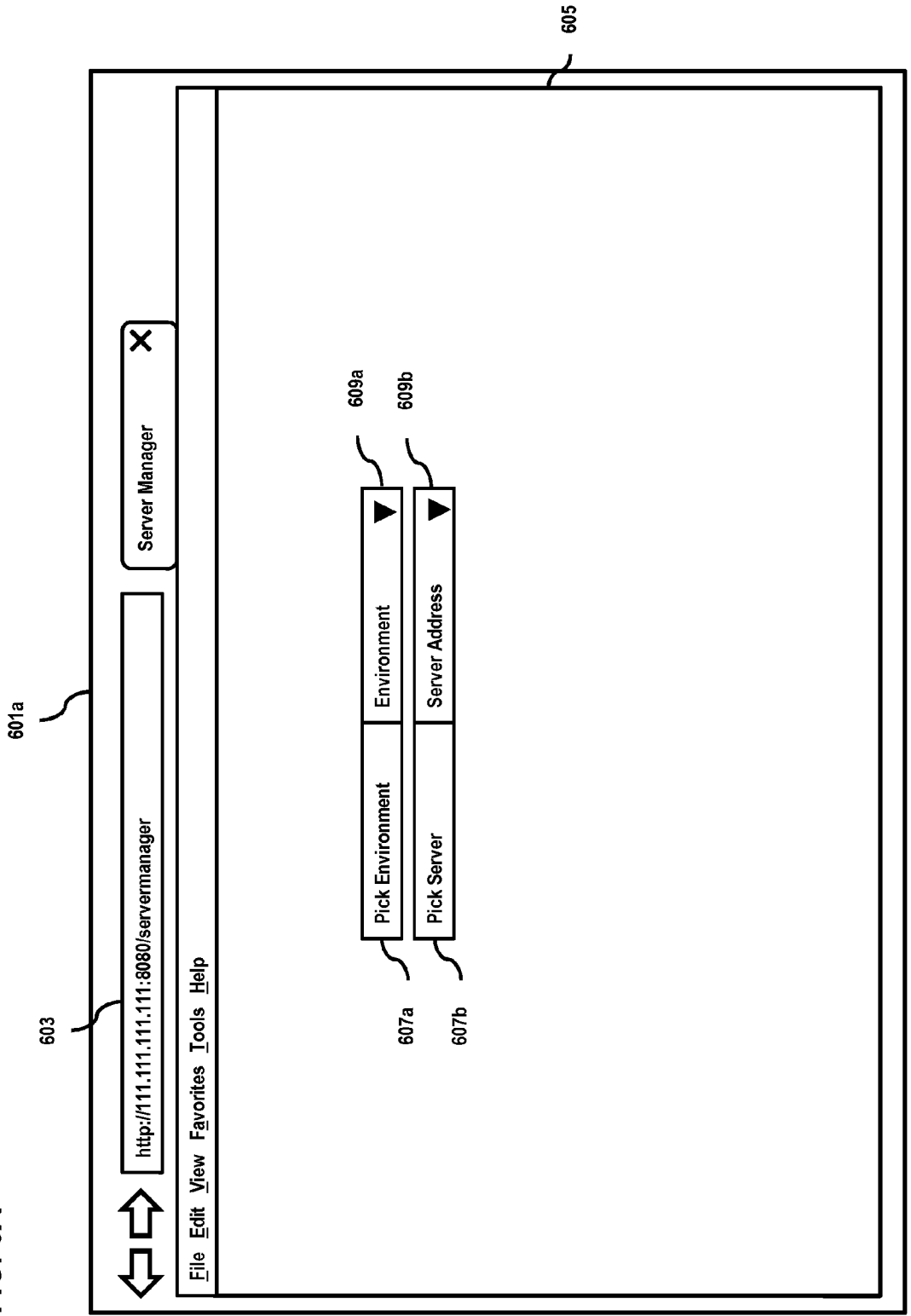
FIGS. 6A-6D are diagrams of user interfaces utilized in the processes of FIGS. 3-5, according to various embodiments.

FIGS. 6A-6D are diagrams of user interfaces utilized in the processes of FIGS. 3-5, according to various embodiments. FIGS. 6A-6D illustrate user interfaces 601a-601d based on a web-based implementation of the garbage collection platform 101. Although FIGS. 6A-6D illustrate a web-based implementation of the garbage collection platform 101, the functionality of the garbage collection platform 101 may be implemented according to other methods, such as a standalone application, a widget, etc. As illustrated in FIG. 6A, a user may access the functionality of the garbage collection platform 101 by typing in a uniform resource locator (URL) that directs a browser to access a web page 605 associated with the garbage collection platform 101. The web page 605 may include indicators 607a and 607b that allow the user to select the computing environment (e.g., through indicator 607a) and a server (e.g., through indicator 607b) for determining whether servers within a computing environment are experiencing full garbage collection. In one embodiment, the user may select one or both indicators 607a and 607b for determining servers experiencing full garbage collection through drop down selectors 609a and 609b.

Figure 6B:
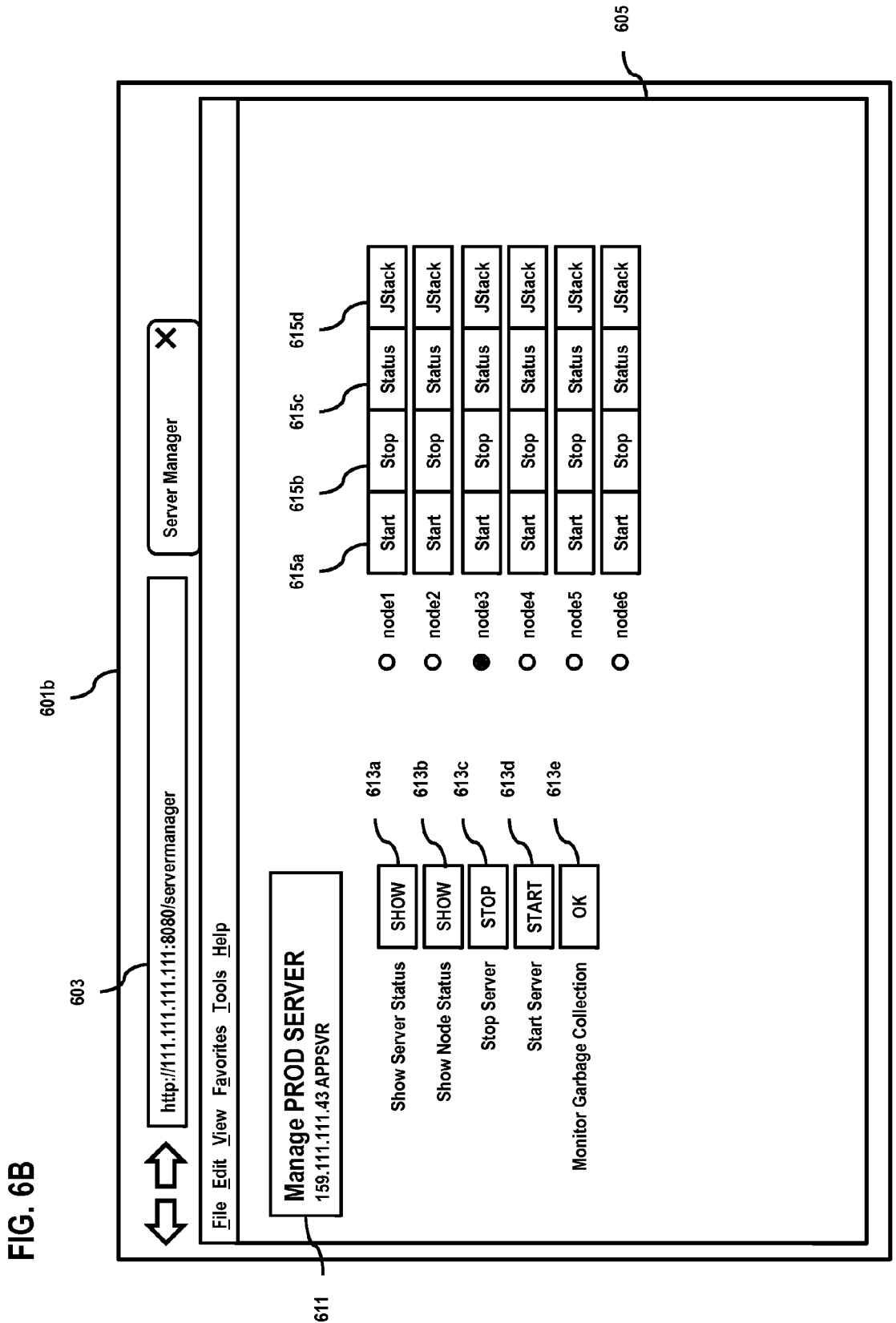

Adverting to FIG. 6B, upon a user selecting a server, user interface 601b is displayed that shows information 611 for the selected server, i.e., the application server at the Internet Protocol (IP) address 159.111.111.43 within the environment PROD Server. Although not shown (for illustrate convenience), in one embodiment a user interface may appear for the user to enter login information, such as a username and password, to log into the selected server. However, in one embodiment, the garbage collection platform 101 includes the necessary login information such that requesting such information from the user is not necessary. As illustrated, the application sever may include six nodes (e.g., node1 through node6). Icons 613a-613e allow a user to implement functions across all nodes associated with the selected application server. For example, icons 613a and 613b cause the garbage collection platform 101 to display server status information (e.g., icon 613a) and node status information (e.g., 613b). Icon 613c instructs the garbage collection platform 101 to stop the selected server and icon 613d instructs the garbage collection platform 101 to start the selected server. Thus, icons 613c and 613d allow all nodes of the application server to be started and stopped by selecting both icons. However, in one embodiment, icons 613c and 613d may be replaced with a single icon for restarting the application server. Further, icon 613e instructs the garbage collection platform 101 to access the memory management information associated with the selected server or the selected environment to monitor the status of garbage collection for all of the nodes.

Further, user interface 601b includes icons 615a through 615d that allow a user to select functionality on a per node basis. By way of example, selecting icons 615a for a particular node causes the particular node to start. Selecting icons 615b for a particular node causes the particular node to stop. However, in one embodiment, icons 615a and 615b may be replaced with a single icon for restarting the particular node. Selecting icons 615c for a particular node causes the garbage collection platform 101 to display status information for the particular node. In one embodiment, the information may include the memory management information for the particular node. However, additional information also may be displayed. Further, selecting icons 615d for a particular node instructs the garbage collection platform 101 to determine the stack trace information (e.g., Jstack request) for the particular node. In one embodiment, all nodes associated with the selected server appear in the user interface 601b. In one embodiment, only nodes experiencing full garbage collection or satisfying a threshold garbage collection appear in the user interface 601b, such as after the user instructs the garbage collection platform 101 to determine the garbage collection information by selecting icon 613e to process the memory management information. In one embodiment, the selected server may not be associated with nodes. In which case, icons 615a-615d and the corresponding node labels do not appear in user interface 601b.

Figure 6C:
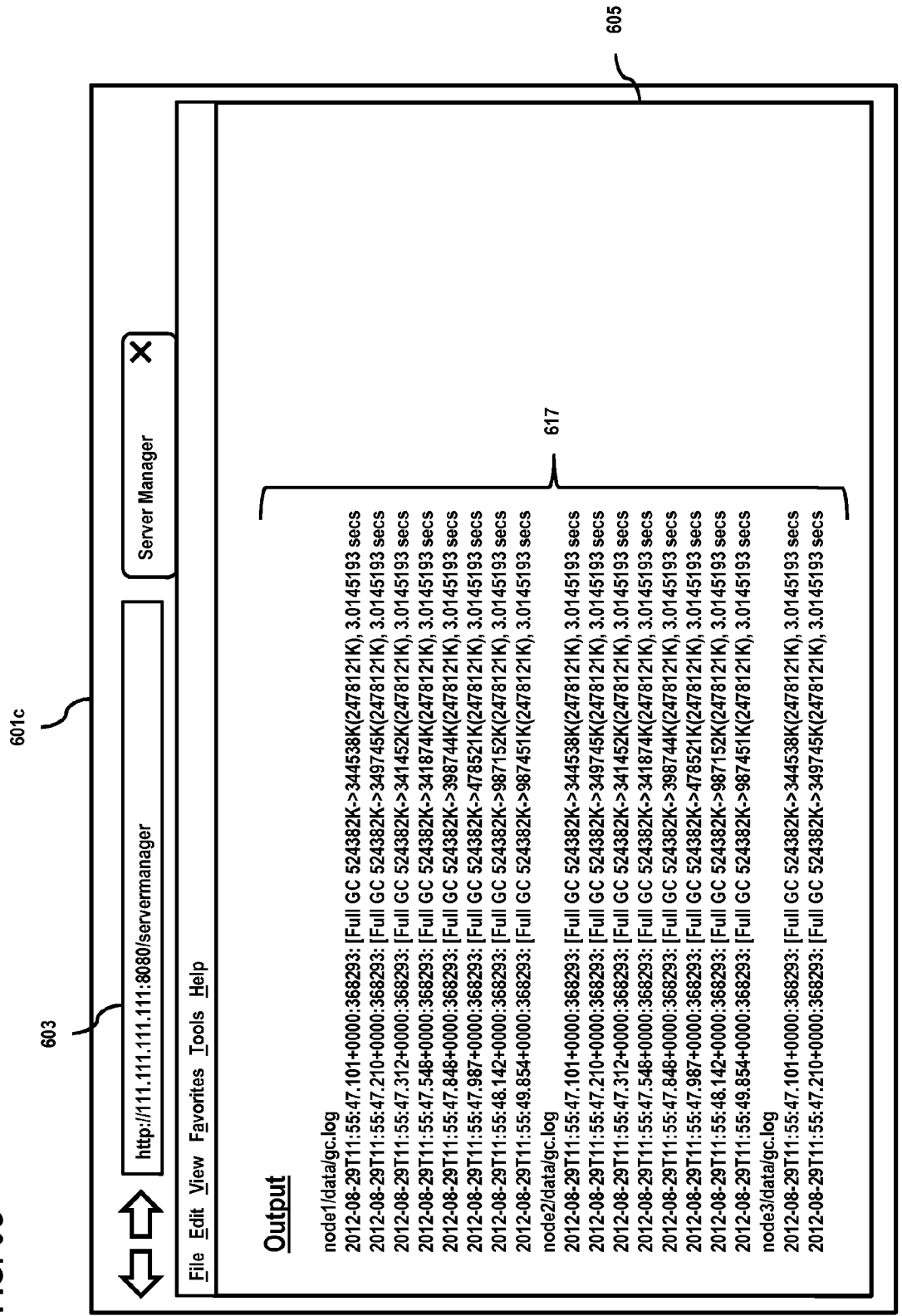

In one embodiment, upon the user requesting the memory management information, such as by selecting icon 613e in FIG. 6B, the garbage collection platform 101 may display the memory management information for all nodes associated with the selected server. FIG. 6C illustrates the user interface 601c displaying the memory management information of nodes of a selected server. The displayed information may be obtained, for example, by the garbage collection platform 101 accessing logs storing the memory management information for each node, such as the server logs 117. The displayed information may then be used to determine which nodes are currently experiencing full garbage collection or which nodes may be about to experience full garbage collection (e.g., satisfy a threshold). By way of an example, a user may view the information displayed in user interface 601c to determine which nodes illustrated in FIG. 6B to restart to reset the memory and correct any full garbage collection issues.

Figure 6D:
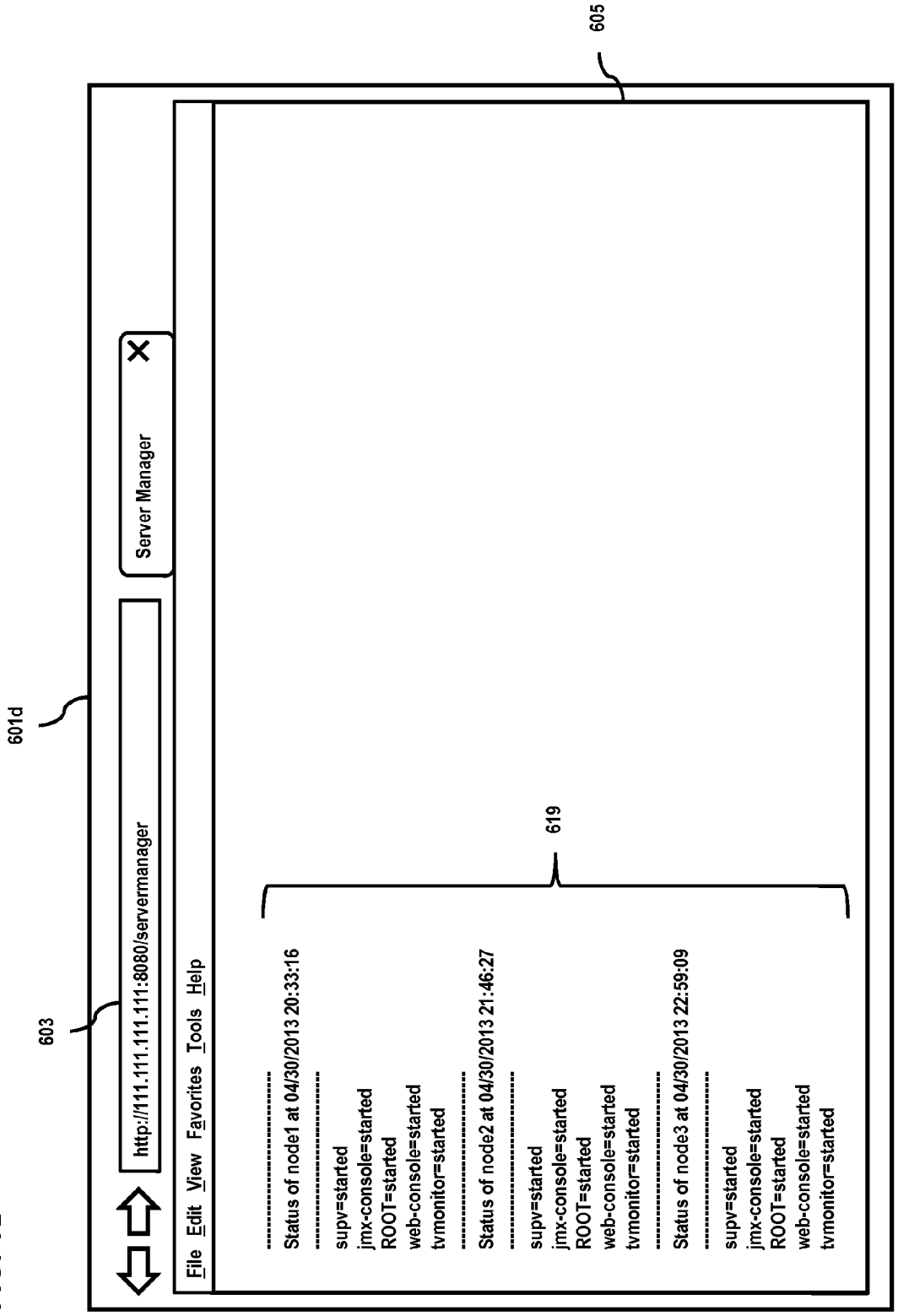

In one embodiment, upon the user requesting the status of the server or nodes, such as by selecting icon 615c in FIG. 6B, the garbage collection platform 101 may display status information for the selected nodes. FIG. 6D illustrates the user interface 601d displaying the status of the selected nodes.

The processes described herein for providing detecting and correcting full garbage collection within a computing environment may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
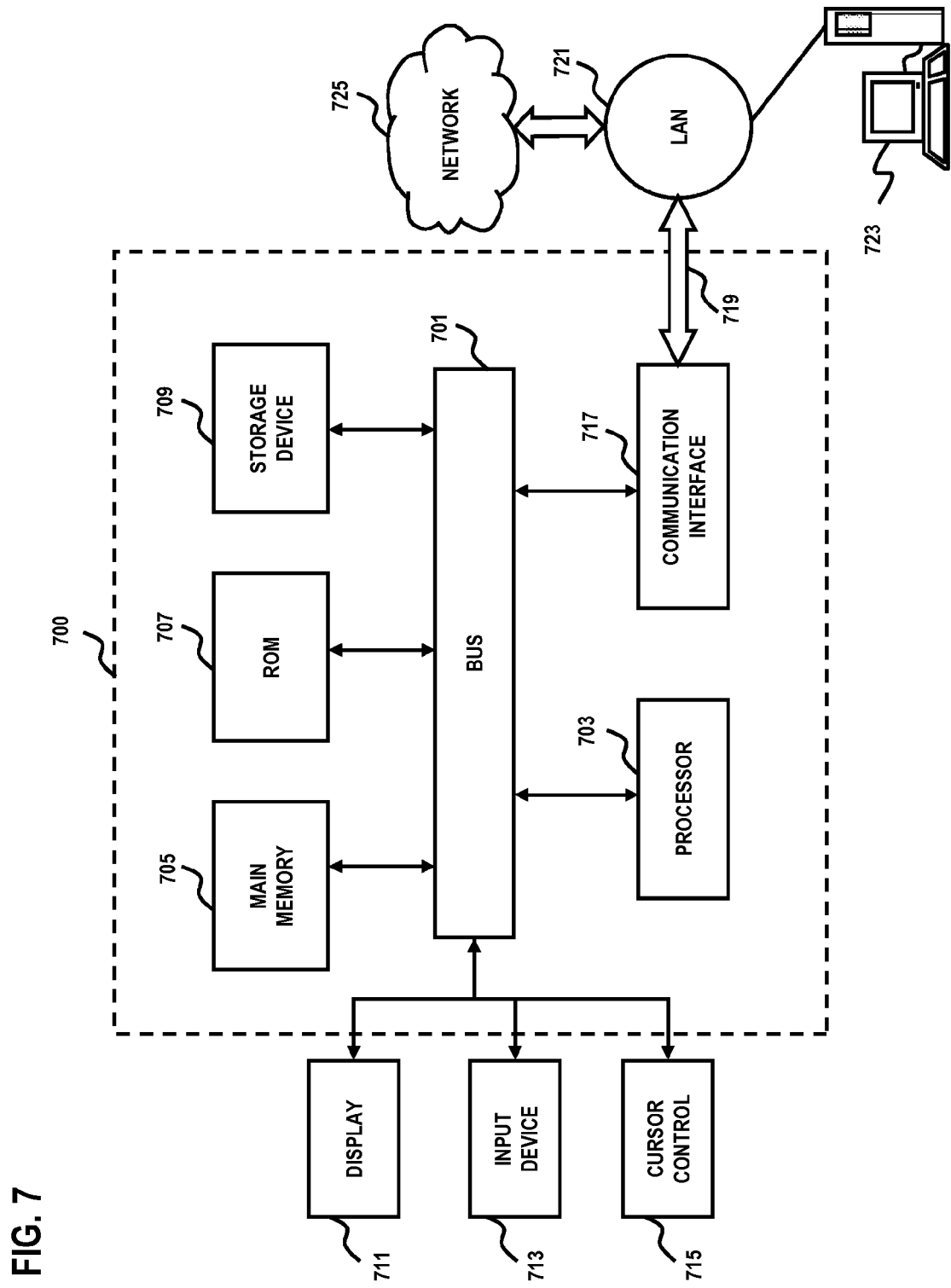
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 8 illustrates a chip set 800 upon which an embodiment of the invention may be implemented. Chip set 800 includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 3-5.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    obtaining memory management information of a computing environment;
    processing the memory management information for determining one or more computing devices within the computing environment that are currently undergoing full garbage collection activity,
    wherein the determining the one or more computing devices that are currently undergoing full garbage collection activity is prior to the one or more computing devices undergoing full garbage collection;
    resetting memory of the one or more computing devices to stop the one or more computing devices from currently undergoing full garbage collection activity,
    wherein resetting memory of the one or more computing devices comprises issuing a restart command to the one or more computing devices while the one or more computing devices are currently undergoing full garbage collection activity; and
    generating an alert based on the memory management information indicating that a specific capacity of memory for the one or more computing devices has reached a threshold limit with respect to objects that are no longer in use.

2. A method according to claim 1, further comprising:
    receiving a request for the memory management information associated with the computing environment; and
    accessing one or more logs associated with the one or more computing devices in response to the request,
    wherein the memory management information is based on garbage collection information within the one or more logs.

3. A method according to claim 1, further comprising:
    issuing a command to at least one of the one or more computing devices for stack trace information prior to resetting the memory; and
    storing received stack trace information in one or more logs.

4. A method according to claim 3, further comprising:
    receiving a request for the stack trace information associated with the at least one of the one or more computing devices; and
    forwarding the received stack trace information to an entity associated with the computing environment, the at least one of the one or more computing devices, or a combination thereof.

5. A method according to claim 1, further comprising:
    forwarding the alert to a designated contact associated with the computing environment.

6. A method according to claim 1, wherein the threshold limit is less than the specific capacity of memory for the one or more computing devices.

7. An apparatus comprising:

at least one processor; and at least one memory including computer program code for one or more programs, the at least one memory and the computer program code configured to, with the at least one processor, cause the apparatus to perform at least the following, obtain memory management information of a computing environment;

process the memory management information for determining one or more computing devices within the computing environment that are currently undergoing full garbage collection activity, wherein the determining the one or more computing devices that are currently undergoing full garbage collection activity is prior to the one or more computing devices undergoing full garbage collection;

reset memory of the one or more computing devices to stop the one or more computing devices from currently undergoing full garbage collection activity, wherein reset memory of the one or more computing devices comprises issue a restart command to the one or more computing devices while the one or more computing devices are currently undergoing full garbage collection activity; and generate an alert based on the memory management information indicating that a specific capacity of memory for the one or more computing devices has reached a threshold limit with respect to objects that are no longer in use.

8. An apparatus of claim 7, wherein the apparatus is further caused, at least in part, to:

receive a request for the memory management information associated with the computing environment; and access one or more logs associated with the one or more computing devices in response to the request, wherein the memory management information is based on garbage collection information within the one or more logs.

9. An apparatus of claim 7, wherein the apparatus is further caused, at least in part, to:

issue a command to at least one of the one or more computing devices for stack trace information prior to resetting the memory; and store received stack trace information in one or more logs.

10. An apparatus of claim 9, wherein the apparatus is further caused, at least in part, to:

receive a request for the stack trace information associated with the at least one of the one or more computing devices; and forward the received stack trace information to an entity associated with the computing environment, the at least one of the one or more computing devices, or a combination thereof.

11. An apparatus of claim 7, wherein the apparatus is further caused, at least in part, to:

forward the alert to a designated contact associated with the computing environment.

12. An apparatus of claim 7, wherein the threshold limit is less than the specific capacity of memory for the one or more computing devices.

13. A non-transitory computer-readable medium carrying one or more sequences of one or more instructions which, when executed by one or more processors, cause an apparatus to at least perform the following steps:

present a prompt for requesting memory management information of a computing environment;

obtain memory management information associated with the computing environment in response to a selection of the prompt;

present the memory management information indicating one or more computing devices within the computing environment are currently undergoing full garbage collection activity, wherein the indicating one or more computing devices that are currently undergoing full garbage collection activity is prior the one or more computing devices undergoing full garbage collection;

present at least one prompt for restarting the one or more computing devices to stop the one or more computing devices from currently undergoing full garbage collection activity, wherein restarting the one or more computing devices resets the memory of the one or more computing devices while the one or more computing devices are currently undergoing full garbage collection activity; and generate an alert based on the memory management information indicating that a specific capacity of memory for the one or more computing devices has reached a threshold limit with respect to objects that are no longer in use.

14. A non-transitory computer-readable medium of claim 13, wherein the apparatus is caused, at least in part, to further perform:

present a prompt for requesting stack trace information associated with the one or more computing devices; and store received stack trace information in response to receiving stack trace information from the one or more computing devices based on a selection of the prompt.

15. A non-transitory computer-readable medium of claim 13, wherein the apparatus is caused, at least in part, to further perform:

forward the alert to a designated contact associated with the computing environment.

16. A non-transitory computer-readable medium of claim 13, wherein the threshold limit is less than the specific capacity of memory for the one or more computing devices.

17. A method according to claim 2, further comprising:

forwarding the alert to a designated contact associated with the computing environment.

18. A method according to claim 4, further comprising:

forwarding the alert to a designated contact associated with the computing environment.

19. An apparatus of claim 8, wherein the apparatus is further caused, at least in part, to:

forward the alert to a designated contact associated with the computing environment.

20. An apparatus of claim 10, wherein the apparatus is further caused, at least in part, to:

forward the alert to a designated contact associated with the computing environment.

* * * * *